United States Patent [19]

Schenk

[11] 4,084,913
[45] Apr. 18, 1978

[54] JOINT SOCKET FOR AN ANGLE JOINT

[75] Inventor: Bernd Schenk, Hamburg, Germany

[73] Assignee: ITW-ATECO G.m.b.H., Norderstedt, Germany

[21] Appl. No.: 664,735

[22] Filed: Mar. 8, 1976

[30] Foreign Application Priority Data

Mar. 20, 1975 Germany .................... 2512253

[51] Int. Cl.² ........................................ F16C 11/10
[52] U.S. Cl. ............................... 403/141; 403/316
[58] Field of Search ............... 403/123, 141, 142, 143, 403/316, 317, 122, 290, 76, 77, 133, 140, 136; 29/149.5 B; 308/72

[56] References Cited

U.S. PATENT DOCUMENTS

| 3,113,780 | 12/1963 | Livingstone | 403/122 X |
| 3,224,801 | 12/1965 | Price-Stephens et al. | 403/122 |
| 3,503,640 | 3/1970 | Eberle | 403/122 |
| 3,759,555 | 9/1973 | Ito | 403/122 |
| 3,787,129 | 1/1974 | Kohler | 403/135 |

FOREIGN PATENT DOCUMENTS 506,722  6/1971  Switzerland .................... 403/141

*Primary Examiner*—Andrew V. Kundrat
*Attorney, Agent, or Firm*—Jack R. Halvorsen; Robert W. Beart

[57] ABSTRACT

A socket for use in a ball and socket joint comprising a bearing basket having a bearing seat to accommodate the pivot ball with a resilient interlocking element to retain the pivot ball in the bearing seat and a displacement member positively locking the resilient element after the ball has been seated.

8 Claims, 6 Drawing Figures

JOINT SOCKET FOR AN ANGLE JOINT

The invention relates to a joint socket for an angle joint, especially a ball and socket joint, comprising a so-called bearing basket having a bearing seat to accommodate a pivot and provided with a resilient interlocking element to retain the pivot in the bearing seat.

With known joint sockets of this type consisting of thermoplastic synthetic material, the interlocking element consists of one or several projections formed integrally with the bearing basket and forming an undercut, said projections being elastically deformed upon insertion of the pivot, preferably a spherical ball, into the bearing seat. With the most frequently used embodiment of such joint sockets the bearing seat is formed as a recess which is open at one side only and the projection forming the undercut is a circumferentially extending rib which is subdivided by one or several slots. With another embodiment, the bearing seat consists of a through bore having respectively arranged, at either axial end thereof, several circumferentially spaced projections axially offset with respect to each other. All of these prior art embodiments are poor in that the forces (mounting forces) required for the insertion of the pivot into the spherical socket are exactly as great as the forces of withdrawal (demounting forces) except for one embodiment which permits a flatter entrance angle for the pivot which, however, will be at the cost of the range of pivotal movement. To be effective, the working load must lie clearly below the mounting force used with these prior art devices.

Spherical sockets (DIN 71 805) have furthermore become known in which an interlocking element is designed as a separate circlip or safety bracket. Apart from the fact that the mounting of separate interlocking elements necessitates additional expenditures, it affects the safety during mounting and in operation. This is the more applicable in cases where relatively difficult mounting operations are involved as may be the case, for example, when using a safety bracket which has to be pushed through bores formed in the bearing basket. Besides, even here, with those ball and socket joints in which the interlocking elements are pre-assembled, the mounting forces practically are exactly as great as the demounting forces.

The present invention solves the problem of providing a socket for an angle joint, of the type indicated at the beginning, in which the mounting force required for the insertion of the pivot into the socket is essentially smaller than the force of withdrawal, without thereby impairing the safety of the interlocking arrangement, the simplicity of the mounting operation, and the extent of the range of pivotal movement.

In accordance with the teachings of the present invention, the problems with a joint socket of the prior art type as indicated hereinabove, are solved by an interlocking element which is supported in such a manner as to be resiliently deflectable into means such as a groove or other recess formed in the bearing. Additionally, a displacement member, to prevent the resilient deflection of the interlocking element, is capable of being inserted in the recess after the mounting of the pivot or bearing pin.

The resiliently deflectable interlocking element, thus, when the pivot is being inserted into the joint socket, may be deflected with the application of a minor force, so that only a very small mounting force is necessary for the mounting of the pivot. After the displacement member has been inserted into the recess, however, the interlocking element is prevented from deflecting so that a very high force will be needed to "withdraw" the pivot or bearing pin. The working load may therefore be essentially higher than the mounting force (ten times as high, for example). The mounting is very simple because after insertion of the pivot into the spherical socket, all that has to be done is to push the displacement member into the recess. A very high degree of safety in operation is furthermore provided. The joint socket according to the present invention may be formed in one piece or may be pre-assembled, and has a wide range of pivotal movement. Finally, the joint socket according to the present invention may be made of materials inexpensive to process, in particular, thermoplastic synthetic materials, so that the joint socket may be made using a production process not requiring any reworking.

A preferred embodiment of the present invention is characterized in that the interlocking element comprises a deflectable tongue forming part of the bearing basket. A projection forming an undercut is suitably formed integrally with the tongue, It would, however, be possible as well to use a separate safety element, such as a circlip or the like, instead of the integrally formed projection, which might be pre-assembled.

The tongue is connected at one end with its rear wall facing away from the bearing seat being suitably separated from the remaining portion of the bearing basket by a slot-like recess and, at its two side walls, by two lateral slots. The tongue might, however, also remain connected with the bearing basket at its side walls by means of skins, membranes or the like.

In a further development of the present invention, the rear wall, slot-like recess is formed as a through bore continuous passage opening through opposite sides of the bearing basket. The two lateral slots are formed with limited axial extent. In accordance with a possible single tongue embodiment of the present invention, the rear wall slot may have a circular, oval or rectangular cross sectional area. According to another embodiment, the rear wall slot has a cross sectional area in the form of a longitudinally slotted cylindrical sleeve extending around substantially the whole bearing seat. With both embodiments, the displacement member is capable of being inserted into the rear wall slot, said displacement member having preferably the same cross sectional area as the rear wall slot.

In a further development of the present invention, the tongue projection extending into the bearing seat has associated therewith at least one more projection forming an undercut, which is preferably diametrically offset with respect to the first projection. The second projection need not be capable of deflection, because the elasticity of the first projection suffices to enable the insertion of the pivot pin into the bearing seat by applying a low force. Both projections in common may extend over a substantial portion of the entire circumference of the bearing seat.

A particularly advantageous embodiment of the invention is characterized in that the displacement member is integrally connected with the bearing basket in the manufacturing of the joint socket and may be separated from the bearing basket after the pivot has been mounted, in order to be capable of being brought into the desired position. The displacement member may be torn off from the bearing basket by an axial blow, for example, which renders the mounting operation particularly foolproof. On the other hand, the displacement member may, of course, also be made separately from the joint socket.

Preferably, the displacement member is secured against dropping from the recess through a clamping effect. Suitably the clamping effect is applied in a portion of the displacement member which is not within the region of the interlocking element, so as not to impair the easy movement of the angle joint.

The interlocking element may extend over a large portion of the circumference of the bearing seat. On the other hand, however, it is also possible to provide several interlocking elements either having associated therewith one displacement member for all in common or being provided with individual displacement members.

The following two preferred embodiments of the invention will be explained in more detail by way of the drawing, wherein.

Figure 1:
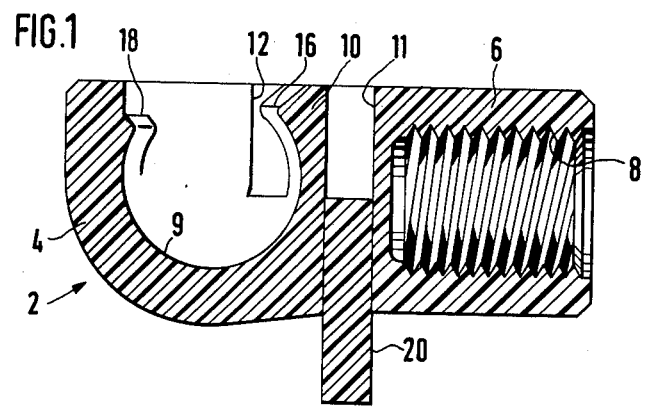
FIG. 1 shows an elevational view in partial section of a first embodiment of the joint socket.
Figure 2:
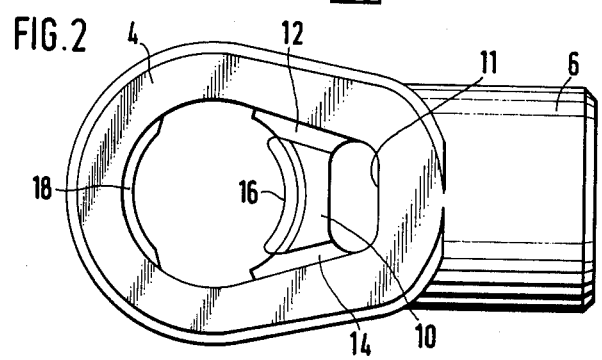
FIG. 2 is a plan view of the joint socket according to FIG. 1.
Figure 5:
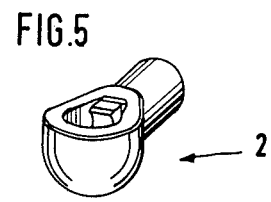
FIG. 5 is a perspective view of the joint socket shown in FIG. 1 on a reduced scale.

The joint socket 2 shown in the FIGS. 1, 2 and 5 which is designed in the form of a ball socket, comprises a bearing basket 4 with a journal-like fastening portion 6 adjoining it. The fastening portion 6 is provided with an inner thread in the usual manner for fastening on a rod-like member. For this purpose, however, either an outer thread on portion 6 might be used or a conventional snap connection.

The bearing basket 4 is provided with a semi-spherical recess serving as a bearing seat 9 which is open at its upper end (in FIG. 1). In the region of the bearing basket 4, adjoining the fastening portion 6, there is provided a tongue 10 serving as an interlocking element. Tongue 10 is formed by a wall portion of the bearing basket defining the bearing seat 9, being defined at the rear side thereof by a slot 11 disposed between the bearing basket 4 and the fastening portion 6, and by two lateral slots 12, 14 at the two sides thereof. Slot 11 is formed as a passage opening of elongated cross sectional area extending over the entire depth of the ball socket and open at both ends. The two lateral slots 12, 14 extend from the open upper side of the bearing basket 4 approximately as far as the center plane of the bearing seat 9. The tongue 10, which is formed in this manner, thus extends essentially in parallel with the axis of symmetry of the bearing seat 9 and is connected with the remaining portion of the bearing basket merely at the underside thereof (in FIG. 1) so that it may be resiliently deflected in a direction towards the slot 11, away from the bearing seat 9.

Tongue 10 is provided with a projection 16 forming an undercut on that side thereof facing the interior of the bearing seat. The shape of the projection 16 results from the formation of the inside of the tongue which is in the form of a portion of a spherical area forming part of the spherical area of the bearing seat 9. Diametrically opposite the projection 16 there is provided another projection 18 which is designed in a similar manner as the projection 16 but is fixedly connected with the wall of the bearing basket 4. Slot 11 has inserted therein a pin-like displacement member 20 which is shown in its half-way pushed-in position. Displacement member 20 has the same cross sectional area as the slot 11 and extends the entire depth of the ball socket 2. Slot 11 and displacement member 20 are dimensioned relative to each other in such a manner, at their lower extremities as viewed in FIG. 1, that the displacement member 20, when in the fully pushed-in position, is prevented from dropping out by being compressed in its lower portion (in FIG. 1).

The spherical socket, as described above, functions as follows: Displacement member 20 is integrally formed with the spherical socket during production thereof at a point outside the slot 11 in such a manner that it may easily be separated (not shown). Upon insertion of the pivot or ball (not shown) into the bearing seat 9 of the bearing basket 4, the tongue 10 with the projection 16 is moved to the right (in FIGS. 1 and 2), whereby the entrance opening for the pivot is enlarged such that the pivot may be inserted into the spherical socket using very low pushing-in forces, while the tongue 10 snaps back into its starting position. Thereafter the displacement member 20 is separated from the spherical socket by exerting an axial blow thereon and is completely pushed into the slot. The displacement member 20 then prevents the tongue 10 from deflection by firm engagement, so that the pivot is interlocked in its position by the projections 16 and 18 without, however, affecting the easy pivotal action of the joint connection. The displacement member 20, as already described, is retained in the slot 11 by compression in its lower portion (in FIG. 1).

Prior to insertion of the pivot into the bearing seat 9, a lubrication material may be accommodated in a reservoir (not shown), however, the choice of a lubricious thermoplastic material for the bearing seat will obviate the need for such a lubricant.

Figure 3:
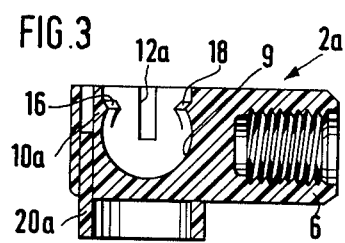
FIG. 3 is an elevational view in partial section of another embodiment of a ball socket.
Figure 4:
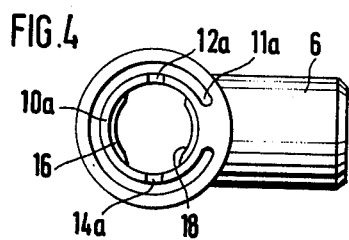
FIG. 4 is a plan view of the socket joint according to FIG. 3.
Figure 6:
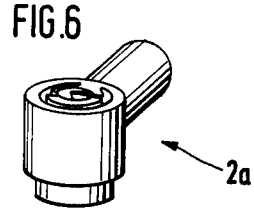
FIG. 6 is a perspective view of the joint socket shown in FIG. 3, on a reduced scale.

The spherical socket 2a shown in FIGS. 3, 4 and 6 utilizes the principle of the preceding embodiment. Like reference numerals have, therefore, been used for corresponding parts, with those parts differing in shape from that of the preceding embodiment having been characterized with an "a" added to the reference numeral.

As with the preceding embodiment, a resiliently deflectable tongue 10a is provided which, however, in the present case is arranged on the narrow side of the spherical socket 2a opposite from the fastening portion 6. The tongue 10a, in this case, is defined by a circular sleeve-like slot 11a extending over a substantial portion of the entire circumference of the bearing seat 9. The lateral slots 12a, 14a are disposed in a radial plane normal to the axis of the fastening portion 6. The tongue 10a, which thus extends through about 180° circumferentially of the bearing seat, is again provided with a projection 16. Diametrically opposite thereof, as with the previous embodiments, there is arranged another projection 18 which is fixedly connected with the bearing basket. The displacement member 20a is designed in the form of a longitudinally slotted sleeve or cylinder corresponding to the shape of the slot 11a.

The manner of functioning of this embodiment is the same as that of the preceding embodiment.

I claim:

1. A joint socket for an angle joint, especially a ball and socket joint, comprising a bearing basket having a bearing seat for accommodating a pivot and provided with at least one resilient interlocking element to retain the pivot in the bearing seat, said interlocking element comprising a deflectable tongue (10;10a) forming a portion of the bearing basket (4), said tongue (10;10a) including a projection (16) forming an undercut which serves as the interlocking element to retain the pivot in the bearing seat, said tongue (10;10a) at the rear wall thereof opposite from the bearing seat (9) is separated from the remaining part of the bearing basket (4) by an open ended slot (11;11a) extending the entire depth of the bearing basket and said tongue is further separated at the two side walls thereof by two lateral slots (12;14;12a;14a), said tongue (10;10a) being capable of resilient deflection into said slot (11;11a), and at least one displacement member (20;20a) capable of being inserted into the slot (11;11a) to prevent the resilient deflection of the tongue after the pivot has been mounted in the seat (9).

2. A joint socket according to claim 1, characterized in that the bearing basket defines said rear wall slot (11) and has a substantially rectangular cross sectional area.

3. A joint socket according to claim 1, characterized in that the bearing basket defines a rear wall slot (11a) having a cross sectional area adapted to accept a longitudinally split sleeve which extends substantially around the circumference of the bearing seat (9).

4. A joint socket according to claim 1, characterized in that the displacement member (20;20a) is complimentary to and capable of being inserted into the rear wall slot (11;11a).

5. A joint socket according to claim 1, characterized in that the projection (16) has associated therewith at least one more projection (18) forming an undercut, which is preferably arranged diametrically opposite the first projection (16), whereby said pivot is restrained in said seat (9) by at least two circumferentially spaced projections (16;18).

6. A joint socket according to claim 1, characterized in that the displacement member (20;20a) is integrally frangibly connected with the bearing basket (4) and may be separated from the bearing basket after the pivot has been mounted and capable of being brought into the proper insertion position.

7. A joint socket according to claim 1, characterized in that the displacement member (20;20a) is secured against dropping from the recess (11;11a) through a clamping effect.

8. A joint socket according to claim 1, characterized in that there are provided several interlocking tongue elements and at least one displacement member associated therewith.

* * * * *